(12) United States Patent
Chu et al.

(10) Patent No.: US 10,583,793 B2
(45) Date of Patent: Mar. 10, 2020

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Sanguk Chu, Hwaseong-si (KR); Kwang Cheol Shin, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 21 days.

(21) Appl. No.: 15/796,266

(22) Filed: Oct. 27, 2017

(65) Prior Publication Data
US 2019/0001908 A1 Jan. 3, 2019

(30) Foreign Application Priority Data
Jul. 3, 2017 (KR) .................. 10-2017-0084143

(51) Int. Cl.
| | | |
|---|---|---|
| B60R 21/00 | (2006.01) | |
| B60R 21/017 | (2006.01) | |
| H02J 7/00 | (2006.01) | |
| H02J 9/06 | (2006.01) | |
| B60R 21/01 | (2006.01) | |

(52) U.S. Cl.
CPC .. B60R 21/017 (2013.01); *B60R 2021/01013* (2013.01); *B60R 2021/01156* (2013.01); *H02J 7/0063* (2013.01); *H02J 9/061* (2013.01)

(58) Field of Classification Search
None
See application file for complete search history.

(56) References Cited

U.S. PATENT DOCUMENTS

| | | | |
|---|---|---|---|
| 9,254,806 B2 | 2/2016 | Freienstein et al. | |
| 9,783,059 B2* | 10/2017 | Kim | B60L 3/0007 |
| 2012/0004810 A1* | 1/2012 | Kodama | B60R 21/017 |
| | | | 701/45 |
| 2013/0106174 A1* | 5/2013 | Uchida | F02N 11/0866 |
| | | | 307/9.1 |
| 2015/0375703 A1* | 12/2015 | Modi | B60R 21/017 |
| | | | 307/10.1 |
| 2017/0166145 A1* | 6/2017 | Kinoshita | B60R 16/03 |
| 2018/0201213 A1* | 7/2018 | Gandhi | B60N 2/0276 |

FOREIGN PATENT DOCUMENTS

| | | |
|---|---|---|
| JP | H07-081515 A | 3/1995 |
| JP | 07-96815 A | 4/1995 |
| JP | 2003-252256 A | 9/2003 |
| JP | 2014-073754 A | 4/2014 |

* cited by examiner

*Primary Examiner* — Thomas G Black
*Assistant Examiner* — Demetra R Smith-Stewart
(74) *Attorney, Agent, or Firm* — Morgan, Lewis & Bockius LLP

(57) ABSTRACT

A vehicle comprises: an airbag; a first power supply configured to supply power; a first sensor configured to sense an impact applied to the vehicle; a first wiring connected to the first power supply and configured to transmit the power while the vehicle is running; a second wiring connected to the first power supply and configured to transmit power regardless of whether or not the vehicle is running; and a controller configured to deploy the airbag upon receiving power via the first wiring or the second wiring when the first sensor senses the impact.

17 Claims, 11 Drawing Sheets

VEHICLE AND METHOD OF CONTROLLING THE SAME

CROSS-REFERENCE TO RELATED APPLICATION(S)

This application claims the benefit of priority to Korean Patent Application No. 10-2017-0084143, filed on Jul. 3, 2017 in the Korean Intellectual Property Office, the disclosure of which is incorporated herein by reference.

TECHNICAL FIELD

The present disclosure relates to a vehicle and a method of controlling the same, and more particularly, to a vehicle capable of stably deploying an airbag even when the vehicle is damaged.

BACKGROUND

An airbag installed in a vehicle is a representative occupant protection device with a seat belt. The airbag system may include a sensing system and an airbag module. The sensing system includes a sensor, a battery, a diagnostic device, and the like and the airbag module includes an airbag and a working gas inflation device. When a collision is detected by the sensor, the working gas inflation device explodes and the airbag rapidly inflates by the exploded gas. A high-pressure gas generated by rapid combustion of a solid or a gas stored in a high-pressure gas container is used in the airbag. The use of airbags has been increased worldwide due to excellent passenger protection performance.

Although attempts have been made to deploy airbags by employing a separate energy storage device even when an element related to an ignition (IGN) power is damaged, performance of the airbags is not satisfactory due to spatial constraint and capacity limitations. Thus, extensive research has been conducted on solving these problems.

SUMMARY

An aspect of the present disclosure provides a vehicle capable of deploying an airbag by stably supplying power to an airbag control device even when wiring is defective and a method of controlling the same.

Additional aspects of the disclosure will be set forth in part in the description which follows and, in part, will be obvious from the description, or may be learned by practice of the disclosure.

In accordance with one aspect of the present disclosure, a vehicle comprising: an airbag; a first power supply configured to supply power; a first sensor configured to sense an impact applied to the vehicle; a first wiring connected to the first power supply and configured to transmit the power while the vehicle is running; a second wiring connected to the first power supply and configured to transmit power regardless of whether or not the vehicle is running; and a controller configured to deploy the airbag upon receiving power via the first wiring or the second wiring when the first sensor senses the impact.

The controller may deploy the airbag by receiving power via the first wiring when the first wiring is turned on.

The controller may deploy the airbag by receiving power via the second wiring when the first wiring is turned off.

The vehicle may further include an input configured to receive a parking signal.

The controller may be turned off when the input receives the parking signal.

The vehicle may further include a second sensor configured to sense a speed of the vehicle.

The controller may be turned off when the speed of the vehicle sensed by the second sensor is less than a predetermined speed.

The controller may generate a predetermined voltage by using power received via the first wiring or the second wiring.

The controller may further include a storage device configured to receive power from the first power supply and store the power, and The controller may deploy the airbag by receiving the power from the storage device when the first wiring and the second wiring are turned off.

The vehicle may further include a second power supply comprising an auxiliary battery.

The controller may deploy the airbag by receiving power from the second power supply when the first wiring and the second wiring are turned off.

The controller may increase a voltage output from the second power supply to a predetermined value.

The second power supply may be disposed inside the controller.

In accordance with one aspect of the present disclosure, a method of controlling a vehicle, the method comprising: sensing an impact applied to the vehicle; transmitting power to a controller via a first wiring connected to a first power supply while the vehicle is running; transmitting the power to the controller via a second wiring connected to the first power supply regardless of whether or not the vehicle is running; and deploying an airbag by receiving the power via the first wiring or the second wiring when the impact applied to the vehicle is sensed.

The deploying of the airbag may be performed by deploying the airbag by receiving power via the first wiring when the first wiring is turned on.

The deploying of the airbag may be performed by deploying the airbag by receiving power via the second wiring when the first wiring is turned off.

The method may further include receiving a parking signal, and turning off the controller upon receiving the parking signal.

The method according to claim 11, further comprising sensing a speed of the vehicle, and turning off the controller when the speed of the vehicle is less than a predetermined speed.

The method may further include generating a predetermined voltage by using power received via the first wiring or the second wiring.

The method may further include receiving power from the first power supply and storing the power in a storage device.

The deploying of the airbag may be performed by deploying the airbag by receiving power from the storage device when the first wiring and the second wiring are turned off.

The deploying of the airbag is performed by deploying the airbag by receiving power from a second power supply comprising an auxiliary battery when the first wiring and the second wiring are turned off.

The method may further include increasing a voltage output from the second power supply to a predetermined value.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
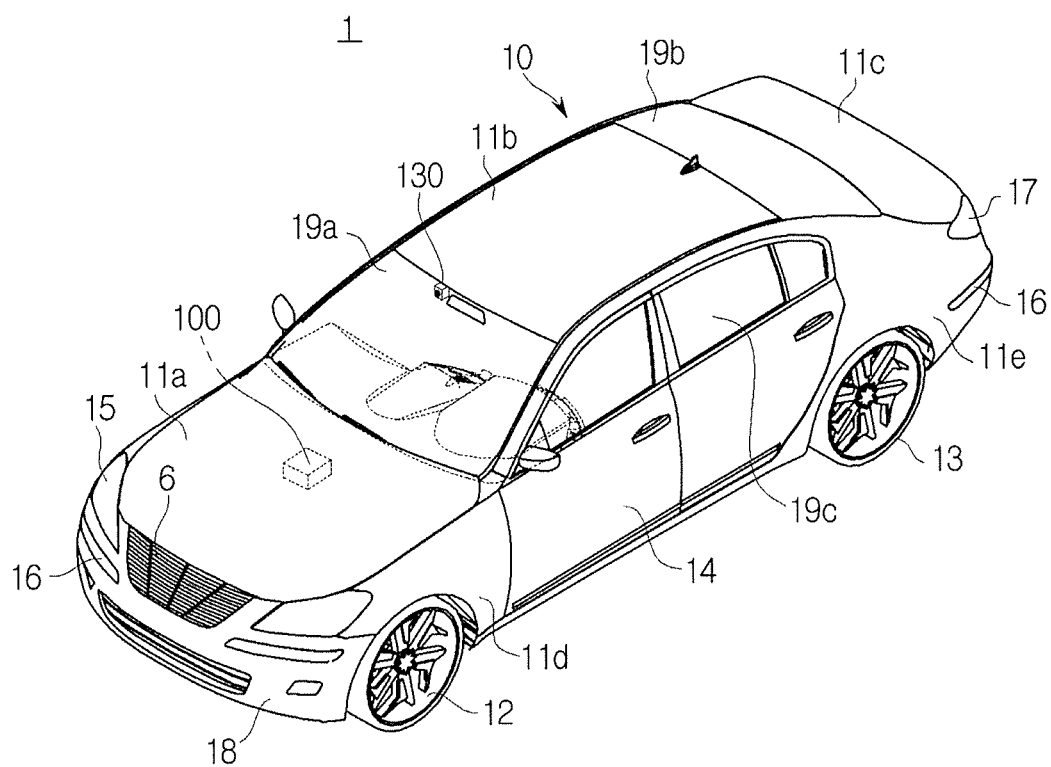
FIG. 1 is a schematic exterior view of a vehicle according to an embodiment.

Reference will now be made in detail to the embodiments of the present disclosure, examples of which are illustrated in the accompanying drawings, wherein like reference numerals refer to like elements throughout. In addition, the terms "unit", "module", "member", and "block" used herein may be implemented by a software or hardware component. According to an embodiment, a plurality of "units", "modules", "members', and "blocks" may be implemented using an element or one "unit", "module", "member", and "block" may include a plurality of elements.

Throughout the specification, when an element is referred to as being "connected to" another element, it may be not only directly connected to the other element but also indirectly connected to the other element with an intervening element disposed therebetween and the "indirectly connected" includes connected via a wireless network.

It is to be understood that the terms such as "including" or "having," etc., are intended to indicate the existence of elements disclosed in the specification, and are not intended to preclude the possibility that one or more other elements may exist or may be added unless otherwise stated.

It will be understood that the terms "first", "second", etc., may be used herein to distinguish one component from another, and these components should not be limited by these terms.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, operating principles and embodiments of the present disclosure will be described with reference to the accompanying drawings.

FIG. 1 is a schematic exterior view of a vehicle according to an embodiment.

Referring to FIG. 1, a vehicle 1 may include a body 10 defining an appearance thereof and wheels 12 and 13 configured to move the vehicle 1.

The body 10 may include a hood 11a configured to protect various devices required to drive the vehicle 1 such as an engine, a roof panel 11b defining an indoor space, a trunk lid 11c defining with an accommodation space, and front fenders 11d and quarter panels 11e provided at sides of the vehicle 1. In addition, a plurality of doors 14 may be hinged to the sides of the body 11.

A front window 19a may be provided between the hood 11a and the roof panel 11b to provide a view ahead and a rear window 19b may be provided between the roof panel 11b and the trunk lid 11c to provide a view behind the vehicle 1. In addition, side windows 19c may be provides at upper positions of the doors 14 to provide side views.

Headlamps 15 may also be provided at front portions of the vehicle 1 to emit light in a traveling direction of the vehicle 1

Turn signal lamps 16 may be provided at front and rear portions of the vehicle 1 to indicate the traveling direction of the vehicle 1.

The vehicle 1 may indicate the traveling direction by turning on the turn signal lamps 16. Tail lamps 17 may also be provided at rear portions of the vehicle 1. The tail lamps 17 may indicate a stat of gear shifting and an operation state of a brake of the vehicle 1 at rear portions of the vehicle 1.

The vehicle 1 may include at least one vehicle controller disposed therein. The vehicle controller may perform electronic control related to the operation of the vehicle 1. The vehicle controller 100 may be installed at an arbitrary position inside the vehicle 1 according to the designer's selection. For example, the vehicle controller may be disposed between an engine room and a dashboard or inside a center fascia. The vehicle controller may include at least one processor that receives an electrical signal, processes the input electrical signal, and outputs the processed signal. The at least one processor may be implemented using at least one semiconductor chip and related parts. The at least one semiconductor chip and related parts are installed on a printed circuit board that may be installed inside the vehicle 1.

At least one imaging unit 130 may be disposed inside the vehicle 1. The imaging unit 130 may acquire images of surroundings of the vehicle 1 while the vehicle 1 is running or stops and acquire position information of vehicles located ahead.

Figure 2:
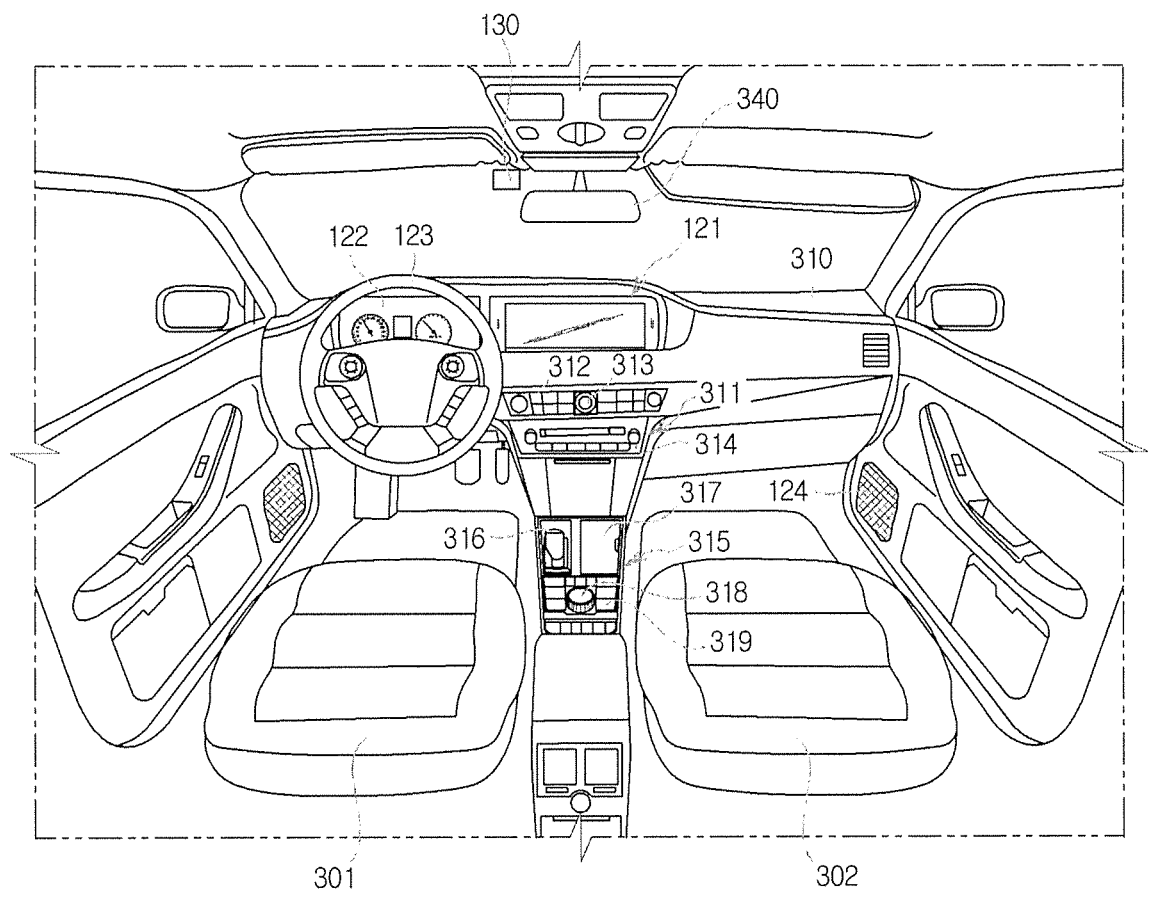
FIG. 2 is an interior view of the vehicle according to an embodiment.

FIG. 2 is an interior view of the vehicle according to an embodiment.

Referring to FIG. 2, the interior of the vehicle 1 includes a driver's seat 301, a passenger's seat 302, a dashboard 310, a driving wheel 320, and an instrument cluster 122.

The dashboard 310 refers to a panel separating the interior of the vehicle 1 from the engine room and provided with various parts required for driving. The dashboard 310 is provided in front of the driver's seat 301 and the passenger's seat 302. The dashboard 310 may include an upper panel, a center fascia 311, a gear box 315, and the like.

A vehicle display device 121 may be installed on the upper panel of the dashboard 310. The vehicle display device 121 may provide the driver and the passenger with various information using images. For example, the vehicle display device 121 may visually provide various information such as a map, weather, news, various moving images or still images, and information on the state or operation of the vehicle 1, e.g., information on an air conditioner. In addition, the vehicle display device 121 may provide the driver and the passenger with warnings in accordance with the degree of risk. Specifically, when the vehicle 1 changes its lane, the vehicle display device 121 may provide the driver with different warning lights in accordance with the degree of risk. In addition, the vehicle display device 121 may output position information of a speed bump and a warning signal therefor. The vehicle display device 121 may also be implemented using a navigation apparatus commonly used in the art.

The vehicle display device 121 may be provided inside a housing integrated with the dashboard 310 such that only a display panel is exposed to the outside. The vehicle display device 121 may be installed at a middle end or lower end of the center fascia 311 or on an inner surface of window 19a or an upper surface of the dashboard 310 using a separate support (not shown). Alternatively, the vehicle display device 121 may also be installed at various positions that a designer may consider.

The navigation apparatus may include the display 121 configured to display information on roads on which the vehicle 1 is running or a route to a destination set by the driver and a speaker 124 configured to output sounds in accordance with a manipulation instruction of the driver.

Various types of devices such as a processor, a communication module, a global positioning system (GPS) receiving module, and a storage device may be installed inside the dashboard 310. The processor installed in the vehicle may be configured to control various electronic devices installed in the vehicle 1 or to perform functions of the vehicle controller as described above. The above-described devices may be implemented using various parts such as semiconductor chips, switches, integrated circuits, resistors, volatile or nonvolatile memories, or printed circuit boards.

The center fascia 311 may be disposed at the center of the dashboard 310 and provided with input devices 312 to 314 to input various instructions related to the vehicle 1. The input devices 312 to 314 may be implemented using a physical button, a knob, a touch pad, a touchscreen, a stick type controller, or a trackball. The driver may control various operations of the vehicle 1 by controlling the input devices 311 to 314, 318, and 319.

The gear box 315 is provided between the driver's seat 301 and the passenger's seat 302 below the center fascia 311. The gear box 315 may be provided with a gear 316, a housing box 317, and various input devices 318 and 319. The input devices 318 and 319 may be implemented using a physical button, a knob, a touch pad, a touchscreen, a stick type controller, or a trackball. The housing box 317 and the input devices 318 and 319 may be omitted according to embodiments.

The driving wheel 320 and the instrument cluster 122 may be disposed on the dashboard 310 at the driver's seat side.

The driving wheel 320 is provided to be rotatable in a predetermined direction according to manipulation of the driver and the vehicle 1 may be steered by turning front wheels or rear wheels according to a rotational direction of the driving wheel 320. The driving wheel 320 includes a spoke connected to a rotary shaft and a rim 123 coupled to the spoke. The spoke may be provided with an input device to input various instructions. The input device may be implemented using a physical button, a knob, a touch pad, a touchscreen, a stick type controller, or a trackball. The rim 123 may have a circular shape for the convenience of the driver but the shape of the rim 123 is not limited thereto. A vibrating unit 201 (FIG. 4) is installed inside at least one of the spoke and the rim 123 and at least one of the spoke and the rim 123 may vibrate at a predetermined strength. According to an embodiment, the vibrating unit may vibrate at various strengths in accordance with an external control signal, and accordingly at least one of the spoke and the rim 123 may vibrate at various strengths in accordance with the external control signal. The vehicle 1 may provide a haptic warning to the driver by using the same. For example, at least one of the spoke and the rim 123 may provide the driver with various warnings by vibrating at a strength corresponding to the degree of risk determined when the vehicle 1 changes its lane. Particularly, as the degree of risk increases, the strength of vibration of the spoke and the rim 123 increases thereby providing the user with a higher warning.

The instrument cluster 122 is disposed to provide various information related to the vehicle 1 such as the speed of the vehicle 1, an engine RPM, a fuel level, a temperature of an engine oil, whether or not a turn signal lamp is blinking, and a travel distance of the vehicle. The instrument cluster 122 may be implemented using an illumination lamp or a scale plate and may also be implemented using a display panel according to embodiments. When implemented using a display panel, the instrument cluster 122 may also provide the driver with various information such as fuel efficiency and whether or not various functions of the vehicle 1 are performed by displaying the information. According to an embodiment, the instrument cluster 122 may also provide the driver with different warnings in accordance with the degree of risk of the vehicle 1. Specifically, when the vehicle 1 changes its lane, the instrument cluster 122 may provide the driver with different warnings in accordance with the determined degree of risk. When the vehicle 1 approaches a speed bump, the instrument cluster 122 may provide the driver with position information of the speed bump.

A room mirror 340 may be provided at an upper portion inside the vehicle 1 and the driver may obtain a view behind the vehicle 1 or the interior of the vehicle 1 via the room mirror 340.

As described above, at least one imaging unit may be disposed inside the vehicle 1. Although FIG. 2 illustrates that the imaging unit is disposed around the room mirror 340, the position of the imaging unit is not limited thereto and the imaging unit may be disposed at any position where image information on the inside or outside of the vehicle may be acquired. The imaging unit 130 may acquire images of surroundings of the vehicle while the vehicle 1 is running or stops.

The imaging unit 130 may include at least one camera and may further include a 3D space recognition sensor, a radar sensor, and an ultrasound sensor to acquire more precise images.

The airbag, which will be described later, may be disposed at the dashboard, the driving wheel, or the like.

Examples of the 3D space recognition sensor may be Kinect (RGB-D sensor), a TOF sensor (Structured Light Sensor), a Stereo Camera, without being limited thereto and the 3D space recognition sensor may include any other devices having similar functions.

Figure 3:
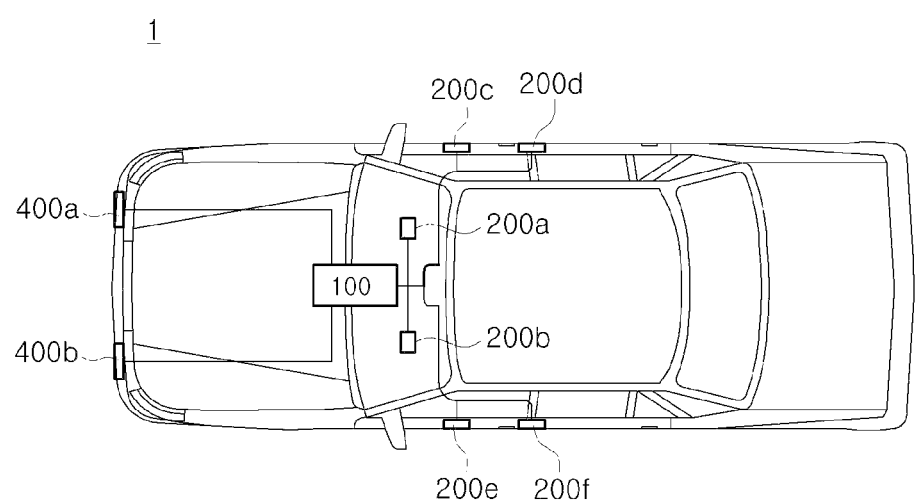
FIG. 3 is a schematic view illustrating an airbag system according to an embodiment.

FIG. 3 is a schematic view illustrating an airbag system according to an embodiment. Referring to FIG. 3, the airbag system may include a controller 100, a sensor 400, and an airbag 200.

The controller 100 that receives signals from sensors 400a and 400b and transmit the signals to airbags 200a, 200b, 200c, 200d, 200e, and 200f may include a safety device provided against signal transmission errors.

The sensors 400a and 400b may transmit impact received by the vehicle in the event of collision to the controller 100 to deploy the airbags 200a, 200b, 200c, 200d, 200e, and 200f. The sensors 400a and 400b may be implemented using sensors configured to sense impact applied to the vehicle or sensors configured to measure a speed of the vehicle which will be described later.

The airbags 200a, 200b, 200c, 200d, 200e, and 200f may be provided on the dashboard, the driving wheel, the doors at sides of the vehicle, and the like and may inflate by compressed air upon receiving a signal from the airbag control device.

Figure 4:
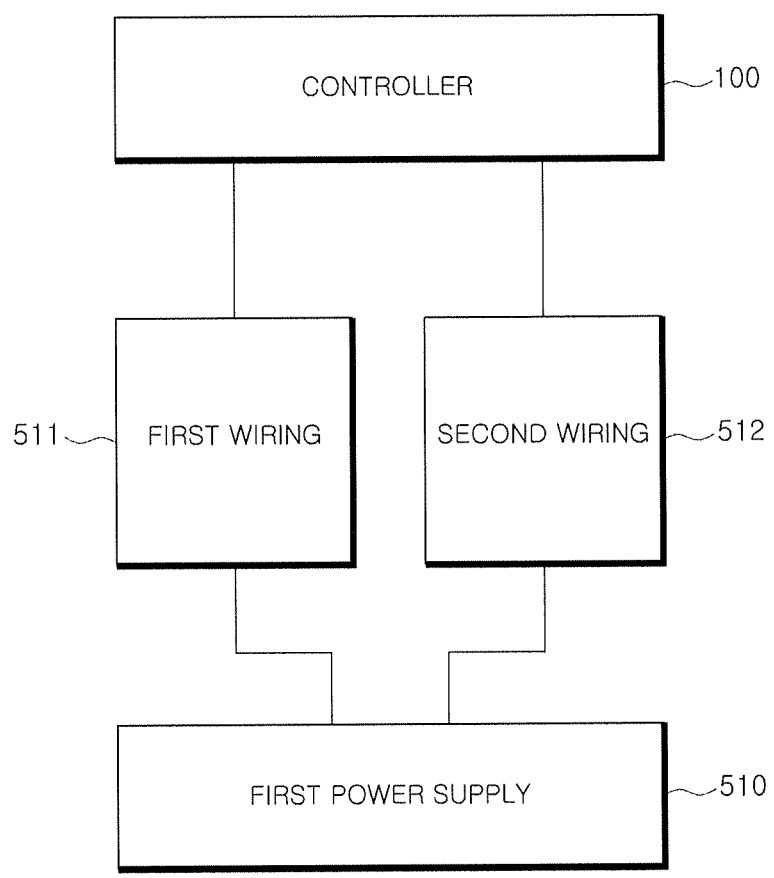
FIG. 4 is a block diagram illustrating relationship between a controller and a power supply.

FIG. 4 is a block diagram illustrating relationship between a controller and a power supply.

Referring to FIG. 4, the controller 100 may receive power via a first wiring 511 and a second wiring 512. A first power supply 510 may be an ignition (IGN) power supply and a second power supply 520 may be a regular power supply that always supplies power B+.

IGN power is power supplied when an ignition key is turned on. When power is normally supplied, the controller 100 controls the airbag by receiving power from the IGN power supply. Since the airbag is a device to minimize impact when an accident occurs while the vehicle is running, current is not supplied while the vehicle is not running to prevent a loss of dark current.

The regular power supply supplies power regardless of ignition switch position of the vehicle and may be used mainly for PIC recognition, electric seats, emergency lamps, and the like which require the supply of power even when the ignition switch is turned off.

While the vehicle is running, power is normally supplied to the controller 100. Thus, while the supply of power is normally performed, power is supplied to the controller 100 from an IGN circuit, so that deployment of the airbag may be performed without problems. However, when wiring used for the IGN power supply to supply power to the controller 100 or the whole power supply system malfunctions, power may not be properly supplied to the airbag resulting in abnormal airbag deployment. Thus, according to the present embodiment, even when the IGN power supply cannot supply power to the controller 100, the regular power supply may supply power to the airbag control device enabling normal deployment of the airbag.

Figure 5:
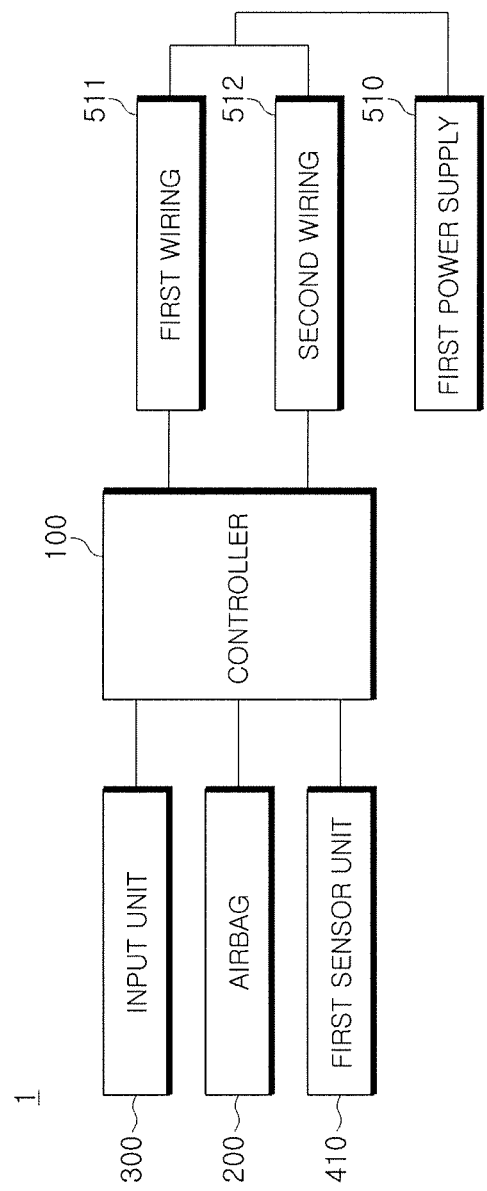
FIGS. 5 and 6 are control block diagrams of a vehicle according to an embodiment.
Figure 6:
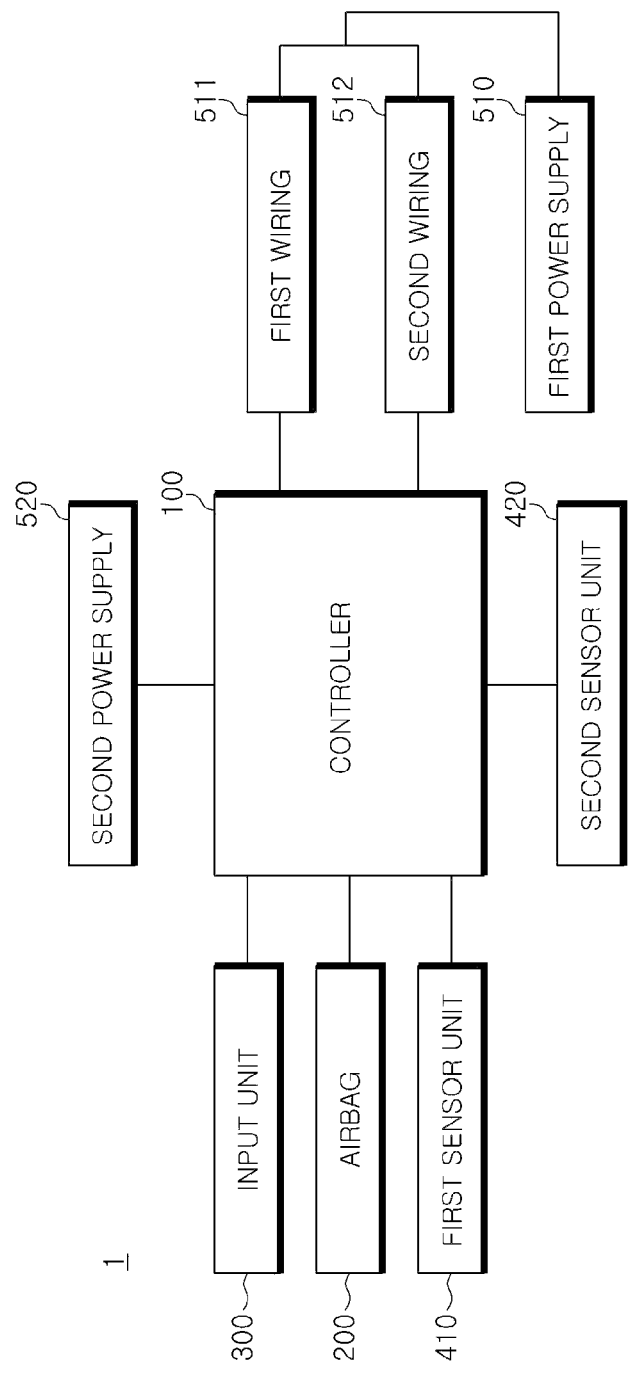

FIGS. 5 and 6 are control block diagrams of a vehicle according to an embodiment.

Referring to FIG. 5, the vehicle may include an input 300, a first sensor 410, a controller 100, an airbag 200, and first and second wirings 511 and 512, and a first power supply 510.

The input 300 may be configured to allow a driver to shift gears of the vehicle and may be implemented using a transmission lever provided at the gear box 315 according to the present embodiment. The input 300 may include a hardware device for a user's input such as various buttons, a switch, a pedal, a keyboard, a mouse, a track-ball, various levers, a handle, or a stick. The input 300 may receive a start signal START, ACC, IGN1, and IGN2 input by the user. In addition, the input 300 may set the gear of the vehicle in a park P mode, a reverse R mode, or a drive D mode.

The first sensor 410 may include an impact sensor configured to sense impact applied to the vehicle. The impact sensor may transmit a signal to the controller 100 to deploy the airbag based on the impact applied to the vehicle as described above. The first power supply 510 may supply electrical energy to devices installed in the vehicle. The first power supply 510 is required to start the vehicle and servers as a power source for various control systems to start ignition. The first power supply 510 may be implemented using a lead-acid battery or a maintenance free (MF) battery. The first power supply 510 may supply power to the controller 100 via the first and second wirings 511 and 512.

The first and second wirings 511 and 512 may be configured to supply power to the controller 100. The first wiring 511 may primarily supply power the controller 100. The controller 100, which deploys the airbag 200 provided in the vehicle 100, requires power during driving of the vehicle. The first wiring 511 may be realized by the above-described IGN power supply.

The second wiring 512 may supply power to the controller 100 when the first wiring 511 cannot supply power to the controller 100. As described above, the second wiring 512 may be realized by the regular power supply B+. The second wiring 512 may supply power to the controller 100 regardless of ignition switch position of the vehicle.

The controller 100 may include a memory configured to store programs used to perform the operation described above and below and a variety of data related thereto, a processor configured to execute the programs stored in the memory, and a micro controller unit (MCU). In addition, the controller 100 may be integrated into a system on chip (SOC) built in the vehicle 1 and operate by the processor. However, since not only one SOC but also a plurality of SOCs may be provided in the vehicle 1, the embodiment is not limited to the case of being integrated into only one SOC.

The controller 100 may store driving-related information of the vehicle while running. For example, the controller 100 may store information on environments surrounding the vehicle while the vehicle is running at a low speed. The controller 100 may deduce information on a situation in which the airbag is deployed based on the stored information. The controller 100 may be implemented using at least one type of storage medium selected from a flash memory type, a hard disk type, a multimedia card micro type, a card type memory (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. However, the present embodiment is not limited thereto and the controller 100 may also be implemented using any other type well known in the art. The configuration of the controller 100 will be described in more detail later.

The controller 100 may communicate with the input 300 and the first sensor 410. The controller 100 may use a controller area network (CAN) of the vehicle 1. The CAN network refers to a network system used for data transmission and control thereof among electronic control units (ECU) of the vehicle. Specifically, the CAN network transmits data via a pair of data wires twisted or shielded by coating. The CAN network operates according to a multimaster principle in which multiple ECUs serve as masters in a master/slave system. According to the present embodiment, the controller 110 may receive information on the vehicle in real time by using the sensor, the input, and the CAN network.

The controller 100 may be turned off by cutting off power supplied via the first and second wirings 511 and 512 in the case where a parking signal is input via the input 300.

In addition, the controller 100 may receive data via an in-vehicle wired communication network such as local interconnect network (LIN) and media oriented system transport (MOST) of the vehicle 1 or sensing values from a camera 100 via a wireless communication network such as Bluetooth.

The controller 100 may determine wirings 511 and 512 to receive power upon receiving a start signal from the input. For example, when the start signal is not input via the input 300, the controller 100 may receive power from the regular power supply. When the start signal is input, the controller 100 may receive power from the IGN power supply. Since the airbag 200 is generally deployed while the vehicle is running, the controller 100 may receive power from the IGN power supply upon receiving a start signal from the input 300 and transmit the power to the airbag 200. The controller 100 may receive a parking signal from the input 300. When the parking signal is received, there is no need to deploy the airbag 200, so that the controller 100 may turn off the power supply.

The first sensor 410 may sense an impact applied to the vehicle. Upon sensing the impact applied to the vehicle, the first sensor 410 may transmit an impact signal to the controller 100. When the impact is greater than a predetermined level, the controller 100 may deploy the airbag 200.

FIG. 6 is a control block diagram of the vehicle illustrated in FIG. 5 further including a second power supply and a second sensor. The second power supply 520 may be implemented using an auxiliary battery. Although the second power supply 520 is located outside the controller 100 in FIG. 6, the second power supply 520 may also be disposed inside the controller 100. When the first wiring 511 malfunctions as described above, power may be supplied via the second wiring 512. However, the second wiring 512 may also malfunction. The second power supply 520 may supply power to the controller 100 for stable deployment of the airbag 200 even when the second power supply 512 malfunctions. The second power supply 520 may supply power required for the controller 100 via a battery boost IC in the controller 100 which will be described later.

The second sensor 420 may be implemented using a vehicle speed sensor. The vehicle speed sensor may be a mechanical or electronic speed sensor. In the mechanical speed sensor, a rotation of an output shaft of the transmission is transmitted to a drive shaft of a speedometer by a flexible shaft. In the electronic speed sensor, a rotation of an output shaft of the transmission is detected by using an electronic pick-up, a Hall element, a reed switch, a magnetoresistor, or the like.

Since deployment of the airbag 200 is not necessary at a speed of the vehicle less than a predetermined level, the controller 100 may be turned off based on information obtained by the second sensor 420. On the contrary, since deployment of the airbag 200 is required at a speed of the vehicle greater than a predetermined level, the controller 100 may receive power from the first or second wiring 511 or 512.

When the parking signal is input via the input 300 or the speed of the vehicle measured by the second sensor 420 is less than a predetermined value, the controller 100 may be turned off by cutting off the power received via the first and second wirings 511 and 512. This is because deployment of the airbag 200 is not necessary in these cases.

Figure 7:
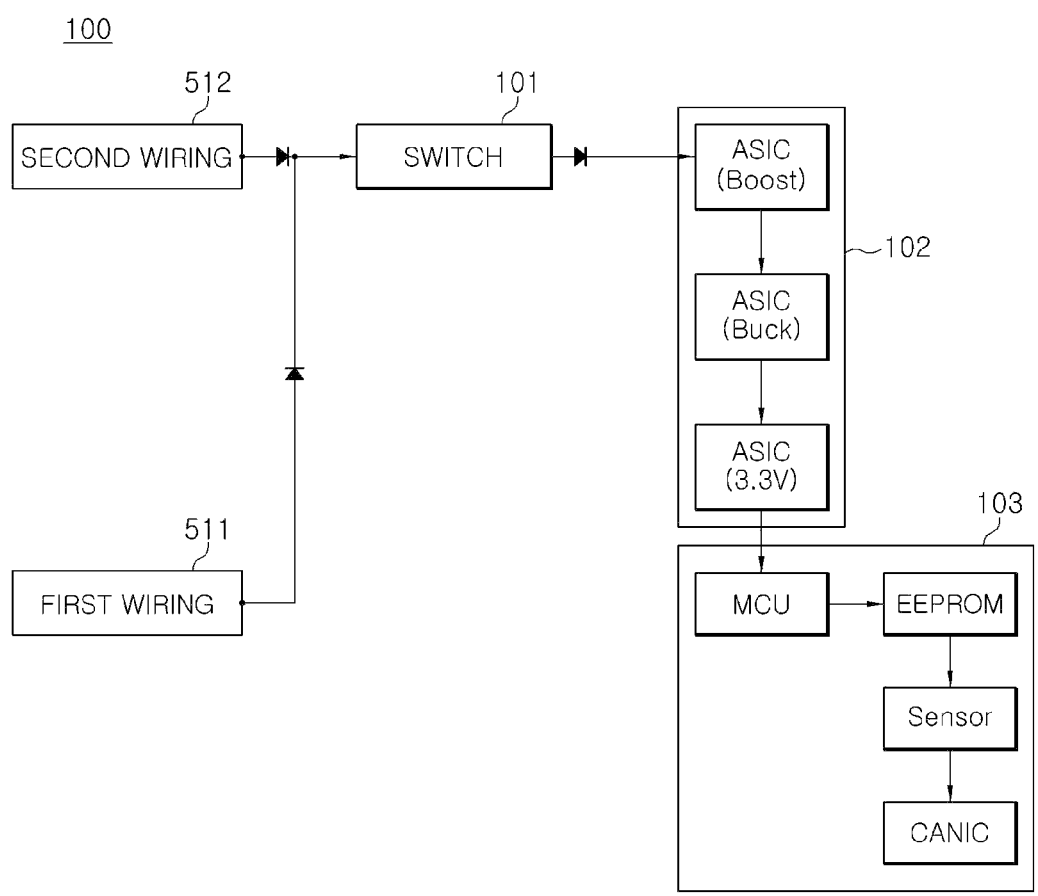
FIGS. 7 and 8 are schematic circuit diagrams of a controller according to an embodiment.
Figure 8:
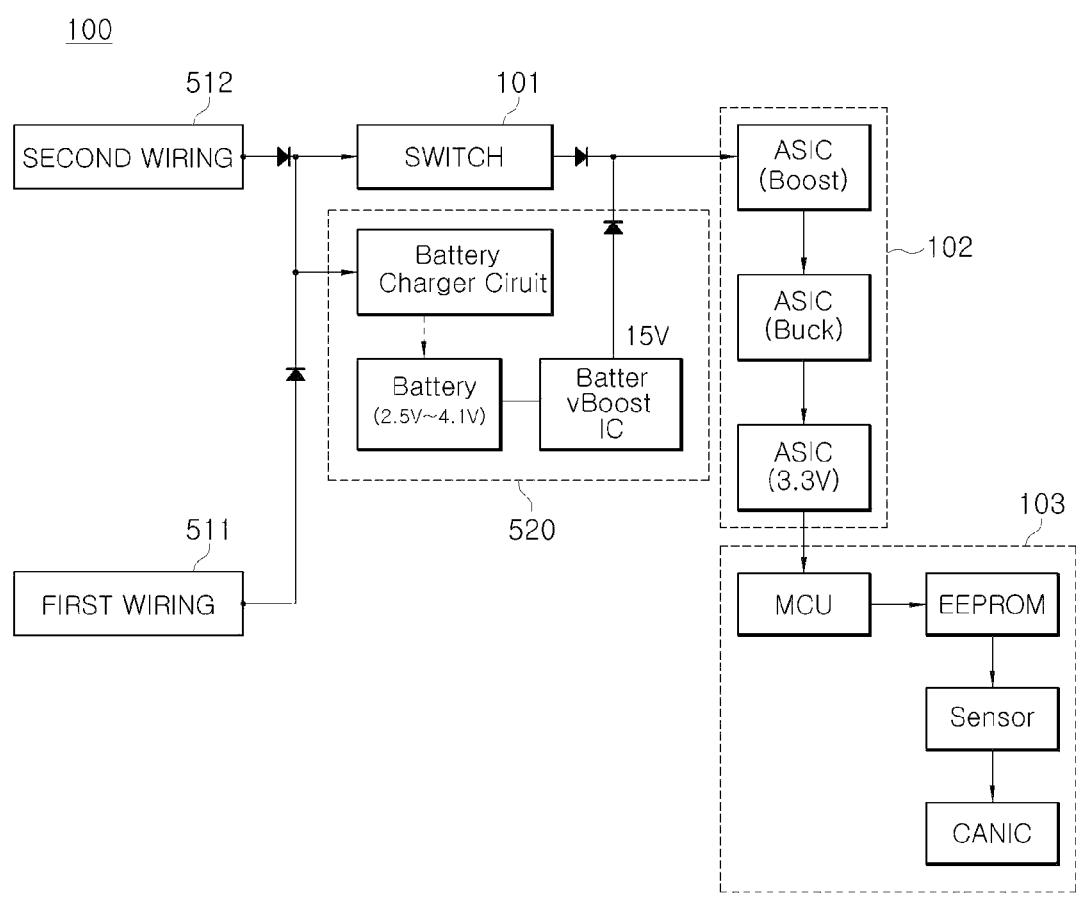

FIGS. 7 and 8 are schematic circuit diagrams of a controller according to an embodiment.

Referring to FIG. 7, the controller 100 may include a switch 101, a voltage regulating circuit 102, and a central processing unit (CPU) 103.

The switch 101 may be connected to the first wiring 511 or the second wiring 512. Normally, the switch 101 may be connected to the first wiring 511 and supply power to the CPU 103. In addition, when the first wiring 511 cannot supply power as described above, the switch 101 may be connected to the second wiring 512 and supply power to the CUP 103 from the second power supply 512.

The voltage regulating circuit 102 serves to convert a voltage input via the switch 101 into a predetermined value. The voltage regulating circuit 102 may be implemented using an application specific integrated circuit (ASIC). The ASIC is an integrated circuit IC including dozens of semiconductors and customized into a single chip. The use of ASICs may reduce the size of products, increase processing speeds, and considerably reduce power consumption. According to an embodiment, the voltage regulating circuit 102 serves to adjust power received from the first wiring 511 or the second wiring 512 into a predetermined voltage according to the usage of the vehicle.

The CPU 103 configured as a single chip including microprocessors and input/output modules controls functions related to the airbag. The CPU 103 may include a CPU core, a memory, and a programmable input/output device. The CPU 103 may include a Micro Controller Unit (MCU), Random Access Memory (RAM), Static Random Access Memory (SRAM), Read-Only Memory (ROM), Electrically Erasable Programmable Read-Only Memory (EEPROM), and Programmable Read-Only Memory (PROM).

FIG. 8 is a circuit diagram illustrating the circuit diagram of FIG. 7 further including a second power supply 520. Referring to FIG. 8, the second power supply 520 may be implemented using a battery provided in the controller 100. The second power supply 520 may include a battery boost IC. The battery boost IC may increase a voltage of a battery provided in the second power supply 520 and supply power to the CPU 103 via the voltage regulating circuit 102.

When both the first wiring 511 and the second wiring 512 cannot supply power, the controller 100 may receive power from the second power supply 520. In this case, power regulated by the battery boost IC and the voltage regulating circuit 102 may be supplied to the CPU 103.

Figure 9:
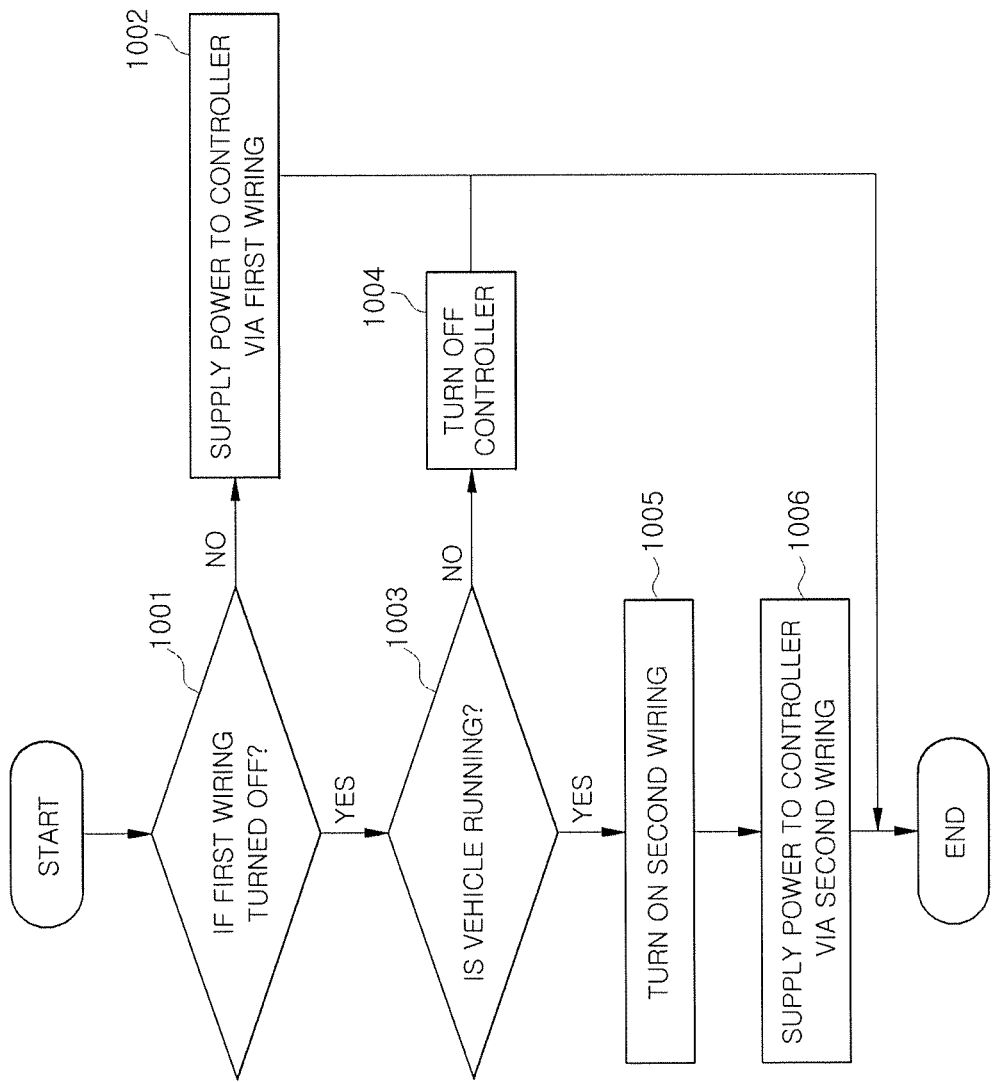
FIGS. 9 and 10 are flowcharts according to an embodiment.
Figure 10:
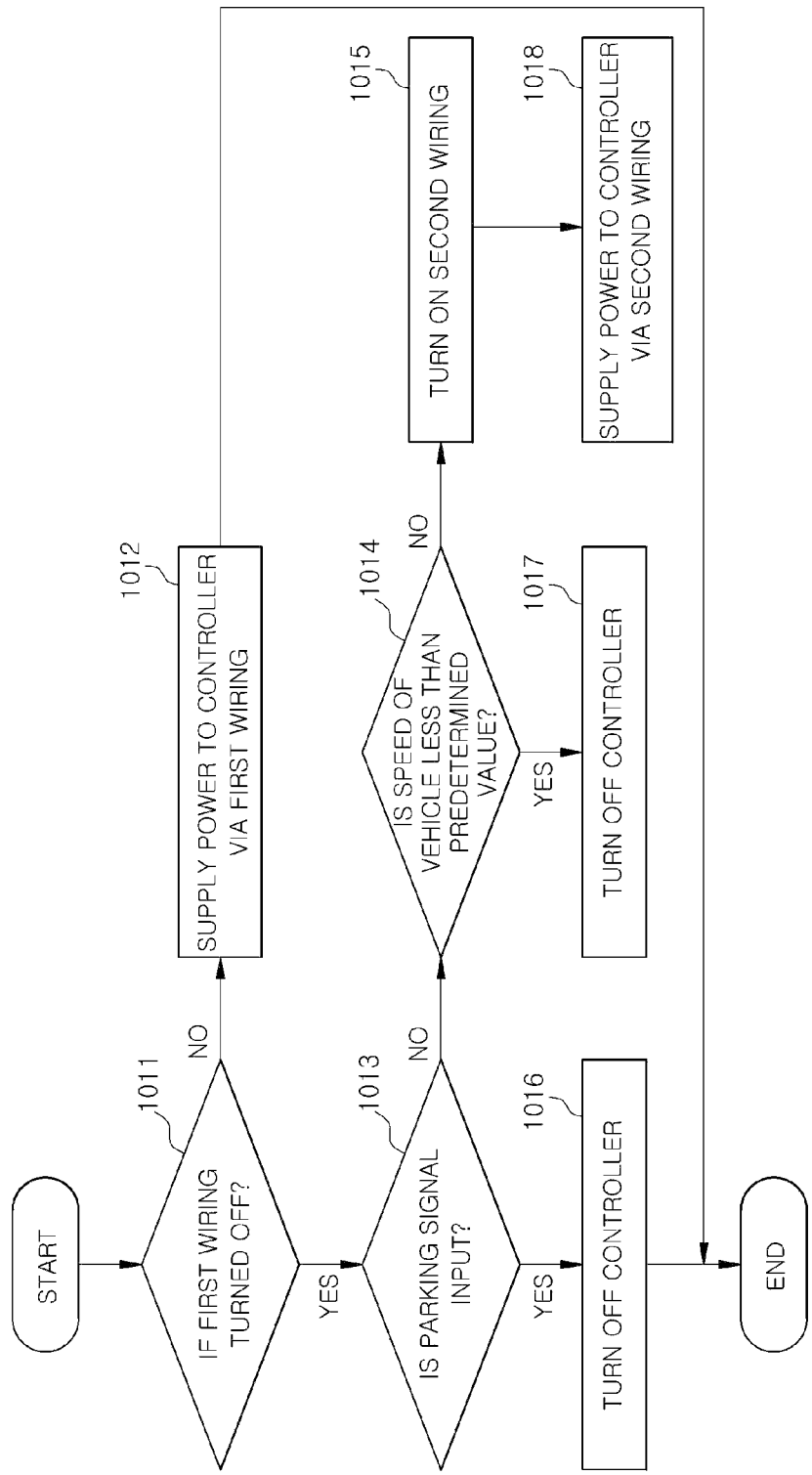

FIGS. 9 and 10 are flowcharts according to an embodiment.

Referring to FIG. 9, the first wiring may be turned off due to a power failure while the vehicle is running (1001). If the power of the first wiring is not turned off, the first wiring may normally supply power to the controller (1002). However, when the first wiring is turned off, it is determined whether or not the vehicle is running (1003). If the vehicle is not running, deployment of the airbag is not necessary, and thus the controller cuts off the power of the controller (1004). On the contrary, if the vehicle is running, power is required to be supplied to the controller, and thus, the switch is switched such that the power is supplied to the controller from the second wiring (1005). When the switch is connected to the second wiring, power is supplied to the controller via the second wiring. Thus, even when the first wiring malfunctions, the airbag may be stably deployed (1006).

FIG. 10 is a detailed flowchart of that illustrated in FIG. 9.

Referring to FIG. 10, a process of determining a driving state of the vehicle illustrated in the flowchart of FIG. 9 is illustrated in more detail. The user may input a parking signal via the input unit (1013). Upon determination that the parking signal is input, the vehicle will no longer be operated, and thus the controller is turned off (1016). In addition, even when the user does not input the parking signal (1014), deployment of the airbag is not necessary at a predetermined speed or less. Thus, upon determination that the vehicle speed is less than the predetermined speed, the controller is turned off (1017). However, while the vehicle is running at a predetermined speed or greater, deployment of the airbag is required in the event of an accident. Thus, the second wiring is switched to supply power to the controller (1015), and the second wiring supplies power to the controller (1018).

Figure 11:
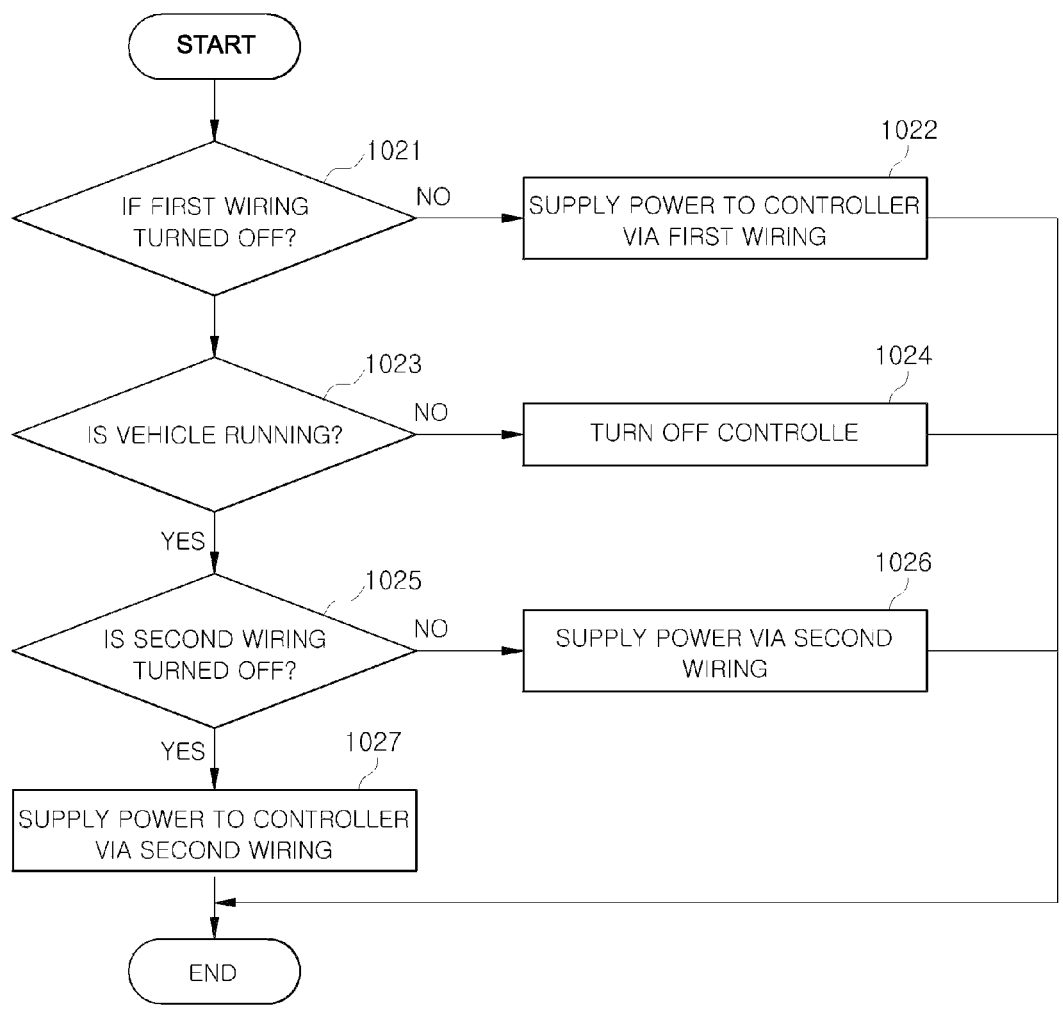
FIG. 11 is a flowchart further including a second power supply.

FIG. 11 is a flowchart further including a second power supply.

The second power supply may be disposed inside or outside the controller as described above. When the first wiring malfunctions (1021), the second wiring may supply power. However, the second wiring may also malfunction (1024). When the second wiring is turned off, the second power supply may supply power to the controller (1026). The operation of supplying power to the controller performed by the second power supply is described above and detailed descriptions thereof will not be repeated.

The aforementioned embodiments may be embodied in the form of a recording medium storing instructions executable by a computer. The instructions may be stored in the form of program codes and perform the operation of the disclosed embodiments by creating a program module when executed by a processor. The recording medium may be embodied as a computer readable recording medium.

The computer readable recording medium includes all types of recording media that store instructions readable by a computer such as Read Only Memory (ROM), Random Access Memory (RAM), magnetic tape, magnetic disc, flash memory, and optical data storage device.

As is apparent from the above description, according to the vehicle and the method of controlling the same, the airbag may be deployed by stably supplying power to the airbag control device even when wiring is damaged.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
an airbag;
a first power supply configured to supply power;
a first sensor configured to sense an impact applied to the vehicle;
a first wiring connected to the first power supply and transmitting the power to a controller while the vehicle is running;
a second wiring connected to the first power supply and transmitting power to the controller regardless of whether or not the vehicle is running; and
the controller configured to deploy the airbag upon receiving power via the first wiring or the second wiring when the first sensor senses the impact,
wherein the controller deploys the airbag by receiving power via the second wiring when the first wiring is turned off.

2. The vehicle according to claim 1, wherein the controller deploys the airbag by receiving power via the first wiring when the first wiring is turned on.

3. The vehicle according to claim 1, further comprising an input configured to receive a parking signal,
wherein the controller is turned off when the input receives the parking signal.

4. The vehicle according to claim 1, further comprising a second sensor configured to sense a speed of the vehicle,
wherein the controller is turned off when the speed of the vehicle sensed by the second sensor is less than a predetermined speed.

5. The vehicle according to claim 1, wherein the controller generates a predetermined voltage by using power received via the first wiring or the second wiring.

6. The vehicle according to claim 1, wherein the controller further comprises a storage configured to receive power from the first power supply and store the power, and
the controller deploys the airbag by receiving the power from the storage when the first wiring and the second wiring are turned off.

7. The vehicle according to claim 1, further comprising a second power supply having an auxiliary battery,
wherein the controller deploys the airbag by receiving power from the second power supply when the first wiring and the second wiring are turned off.

8. The vehicle according to claim 7, wherein the controller increases a voltage output from the second power supply to a predetermined value.

9. The vehicle according to claim 7, wherein the second power supply is disposed inside the controller.

10. A method of controlling a vehicle, the method comprising:
sensing an impact applied to the vehicle;
transmitting power to a controller via a first wiring connected to a first power supply while the vehicle is running;
transmitting the power to the controller via a second wiring connected to the first power supply regardless of whether or not the vehicle is running; and
deploying an airbag by receiving the power via the first wiring or the second wiring when the impact applied to the vehicle is sensed,
wherein the deploying of the airbag is performed by deploying the airbag by receiving power via the second wiring when the first wiring is turned off.

11. The method according to claim 10, wherein the deploying of the airbag is performed by deploying the airbag by receiving power via the first wiring when the first wiring is turned on.

12. The method according to claim 10, further comprising:
receiving a parking signal; and
turning off the controller upon receiving the parking signal.

13. The method according to claim 10, further comprising:
sensing a speed of the vehicle; and
turning off the controller when the speed of the vehicle is less than a predetermined speed.

14. The method according to claim 10, further comprising generating a predetermined voltage by using power received via the first wiring or the second wiring.

15. The method according to claim 10, further comprising receiving power from the first power supply and storing the power in a storage,
wherein the deploying of the airbag is performed by deploying the airbag by receiving power from the storage when the first wiring and the second wiring are turned off.

16. The method according to claim 10, wherein the deploying of the airbag is performed by deploying the airbag by receiving power from a second power supply comprising an auxiliary battery when the first wiring and the second wiring are turned off.

17. The method according to claim 16, further comprising increasing a voltage output from the second power supply to a predetermined value.

* * * * *